(12) United States Patent
Baer et al.

(10) Patent No.: US 7,049,558 B2
(45) Date of Patent: May 23, 2006

(54) APPARATUS AND METHOD FOR HEATING MICROFLUIDIC VOLUMES AND MOVING FLUIDS

(75) Inventors: Thomas M. Baer, Mountain View, CA (US); Thomas L. Smith, Campbell, CA (US); Robert H. Reamey, Palo Alto, CA (US)

(73) Assignee: Arcturas Bioscience, Inc., Mountain View, CA (US)

( * ) Notice: Subject to any disclaimer, the term of this patent is extended or adjusted under 35 U.S.C. 154(b) by 0 days.

(21) Appl. No.: 10/765,536

(22) Filed: Jan. 27, 2004

(65) Prior Publication Data

US 2005/0028587 A1 Feb. 10, 2005

Related U.S. Application Data

(60) Provisional application No. 60/443,209, filed on Jan. 27, 2003.

(51) Int. Cl.
*H05B 3/10* (2006.01)
(52) U.S. Cl. ........................................ 219/548; 392/459
(58) Field of Classification Search ................. 219/548; 392/459
See application file for complete search history.

(56) References Cited

U.S. PATENT DOCUMENTS

| | | | |
|---|---|---|---|
| 2,715,668 A | 8/1955 | Booker et al. ............... 219/19 |
| 3,287,684 A | 11/1966 | Armbruster, Jr. ........... 338/211 |
| 3,457,537 A | 7/1969 | Hines ........................ 338/162 |
| 3,679,871 A | 7/1972 | Evalds ....................... 219/499 |
| 3,878,362 A | 4/1975 | Stinger ...................... 219/528 |
| 3,946,200 A | 3/1976 | Juodikis ..................... 219/499 |
| 3,959,692 A | 5/1976 | Wetzel ....................... 317/13 |
| 4,071,736 A | 1/1978 | Kamerling .................. 219/219 |
| 4,124,747 A | 11/1978 | Murer et al. ................ 429/210 |
| 4,237,441 A | 12/1980 | Van Konynenburg et al. ....... 338/22 |
| 4,250,398 A | 2/1981 | Ellis et al. .................. 219/345 |
| 4,388,607 A | 6/1983 | Toy et al. .................... 338/22 |
| 4,400,614 A | 8/1983 | Sopory ....................... 219/528 |
| 4,426,633 A | 1/1984 | Taylor ........................ 338/25 |
| 4,485,297 A | 11/1984 | Grise et al. ................. 219/528 |
| 4,534,889 A | 8/1985 | van Konynenburg et al. ..... 252/511 |
| 4,560,498 A | 12/1985 | Horsma et al. ............. 252/511 |
| 4,560,524 A | 12/1985 | Smuckler .................... 264/105 |
| 4,591,700 A | 5/1986 | Sopory ....................... 219/505 |
| 4,628,187 A | 12/1986 | Sekiguchi et al. .......... 219/505 |
| 4,631,391 A | 12/1986 | Tiepke ........................ 219/541 |
| 4,658,121 A | 4/1987 | Horsma et al. ............. 219/553 |
| 4,727,417 A | 2/1988 | Kanno et al. ................ 358/98 |
| 4,755,553 A | 7/1988 | Kishimura et al. ......... 524/531 |
| 4,761,541 A | 8/1988 | Batliwalla et al. .......... 219/528 |
| 4,774,024 A | 9/1988 | Deep et al. ................. 252/511 |

(Continued)

OTHER PUBLICATIONS www.minco.com Four (4) pages from the website www.minco.com © 2004 & © 2002.

*Primary Examiner*—Thor S. Campbell
(74) *Attorney, Agent, or Firm*—Lukas IP Group; Rimas T. Lukas

(57) ABSTRACT

A device and method for the temperature control, concentration, volume measurement and transport of microfluidic volumes are provided. The device includes one or more heating elements having a resistive material that varies with temperature. The heating elements are formed into a laminar body that may be formed into a variety of geometries and/or easily married to a second body including micro-well plates, micro-centrifuge tubes and microfluidic circuits.

18 Claims, 12 Drawing Sheets

U.S. PATENT DOCUMENTS

| | | |
|---|---|---|
| 4,775,778 A | 10/1988 | Van Konynenburg et al. ..... 219/549 |
| 4,777,351 A | 10/1988 | Batliwalla et al. .......... 219/528 |
| 4,818,439 A | 4/1989 | Blackledge et al. ........ 252/511 |
| 4,845,342 A | 7/1989 | Chen .......................... 219/501 |
| 4,857,711 A | 8/1989 | Watts ......................... 219/548 |
| 4,857,880 A | 8/1989 | Au et al. ...................... 338/22 |
| 4,931,627 A | 6/1990 | Watts ......................... 219/548 |
| 4,935,156 A | 6/1990 | van Konynenburg et al. ..... 219/553 |
| 5,093,036 A | 3/1992 | Shafe et al. ................. 252/511 |
| 5,174,924 A | 12/1992 | Yamada et al. ............. 252/511 |
| 5,181,006 A | 1/1993 | Shafe et al. ................... 338/22 |
| 5,198,639 A | 3/1993 | Smuckler .................... 219/219 |
| 5,206,482 A | 4/1993 | Smuckler .................... 219/219 |
| 5,271,085 A * | 12/1993 | Carballo .................... 392/444 |
| 5,298,721 A | 3/1994 | Smuckler .................... 219/505 |
| 5,363,084 A | 11/1994 | Swinehart ................... 338/308 |
| 5,465,618 A | 11/1995 | Yasui et al. .............. 73/204.27 |
| 5,714,096 A | 2/1998 | Dorfman .................... 252/511 |
| 6,084,217 A | 7/2000 | Bulgajewski ................ 219/505 |
| 6,100,510 A | 8/2000 | Chen et al. .................. 219/497 |
| 6,190,039 B1 | 2/2001 | Yaguchi ..................... 374/164 |
| 6,232,618 B1 | 5/2001 | Wienand et al. ............... 257/48 |
| 6,392,206 B1 * | 5/2002 | Von Arx et al. ......... 219/468.1 |
| 6,413,255 B1 | 7/2002 | Stern ......................... 606/41.1 |
| 6,433,317 B1 | 8/2002 | Arx et al. ................ 219/468.1 |
| 6,558,361 B1 | 5/2003 | Yehurun ..................... 604/272 |
| 6,586,712 B1 | 7/2003 | Mathews, Jr. et al. ...... 219/505 |
| 6,622,746 B1 | 9/2003 | Yang et al. .................... 137/4 |
| 6,632,399 B1 | 10/2003 | Kellogg et al. ................ 422/72 |
| 6,632,400 B1 | 10/2003 | Brennen et al. ......... 422/82.01 |
| 6,647,779 B1 | 11/2003 | Ishiguro et al. .......... 73/204.26 |
| 6,649,994 B1 | 11/2003 | Parsons ...................... 257/470 |
| 6,652,745 B1 | 11/2003 | Gjerde et al. ............ 210/198.2 |
| 6,664,104 B1 | 12/2003 | Pourahmadi et al. .... 435/288.6 |
| 2002/0088111 A1 | 7/2002 | Van Arx et al. .............. 29/611 |
| 2003/0039299 A1 | 2/2003 | Horovitz et al. ............ 374/141 |
| 2003/0091829 A1 | 5/2003 | Handa et al. ............... 428/413 |

* cited by examiner

APPARATUS AND METHOD FOR HEATING MICROFLUIDIC VOLUMES AND MOVING FLUIDS

CROSS-REFERENCE TO RELATED APPLICATIONS

This application claims priority to U.S. Provisional Application Ser. No. 60/443,209, entitled "Method for heating microfluidic circuits and moving fluids", filed on Jan. 27, 2003 which is incorporated herein by reference in its entirety.

FIELD OF THE INVENTION

The invention relates generally to microfluidic devices and, in particular, microfluidic devices comprised of one or more heating elements having a resistance that varies with temperature.

BACKGROUND OF THE INVENTION

Manipulating fluidic reagents and assessing the results of reagent interactions are central to chemical and biological science. Manipulations include mixing fluidic reagents, assaying products resulting from such mixtures, and separation or purification of products or reagents and the like. Assessing the results of reagent interactions can include autoradiography, spectroscopy, microscopy, photography, mass spectrometry, nuclear magnetic resonance and many other techniques for observing and recording the results of mixing reagents. A single experiment can involve literally hundreds of fluidic manipulations, product separations, result recording processes and data compilation and integration steps. The effects of mixing fluidic reagents are typically assessed by additional equipment relating to detection, visualization or recording of an event to be assayed, such as spectrophotometers, autoradiographic equipment, microscopes, gel scanners, computers and the like. Fluidic manipulations are performed using a wide variety of laboratory equipment, including fluidic mixing devices, centrifugation equipment, molecule purification apparatus, chromatographic machinery, gel electrophoretic equipment and various fluid heating devices.

An example of where heating devices are important is the amplification of nucleic acids which is central to the current field of molecular biology. Library screening, cloning, forensic analysis, genetic disease screening and other increasingly powerful techniques rely on the amplification of extremely small amounts of nucleic acids. As these techniques are reduced to a smaller scale for individual samples, the number of different samples that can be processed automatically in one assay expands dramatically. Microscale devices have evolved which can have few to hundreds of fluidly connected channels, conduits, chambers and wells for handling mircofluidic volumes. New integrated approaches for the handling and assaying of a large number of small samples are needed.

In particular, new integrated approaches for the precise temperature control of microfluidic volumes are needed. For example, in the polymerase chain reaction (PCR) for nucleic acid amplification, a purified DNA polymerase enzyme is used to replicate the sample DNA in vitro. This system uses a set of at least two primers complementary to each strand of the sample nucleic acid template. Initially, the sample nucleic acid is heated to cause denaturation to single strands, followed by annealing of the primers to the single strands, at a lower temperature. The temperature is then adjusted to allow for extension of the primers by the polymerase along the template, thus replicating the strands. Subsequent thermal cycles repeat the denaturing, annealing and extending steps, which results in an exponential accumulation of replicated nucleic acid products. The accuracy and reproducibility of the microfluidic analyses can be highly dependent on the temperature of the fluid volume. Robust heating devices that can accurately control the temperature of microfluidic volumes are required.

The concentration of fluids is another field where heating devices come into play. In many chemical and biochemical analysis methods performed using microfluidic devices, it is advantageous to concentrate an analyte as part of the analysis. For example, increased analyte concentration generally leads to increased chemical reaction rates, increased rates of mass transfer, and enhanced detectability.

One general problem which has not been solved for microfluidics and which the present invention presents is an integrated, reproducible, and inexpensive temperature control for heating, thermal cycling, concentration of fluids, volume measurement, sensing and fluid transport. Prior art solutions in the form of "thermofoils" attempt to solve part of this problem but they involve incorporating resistance temperature detector devices or thermistors into the film and are therefore quite expensive. It is an object of the present invention to provide low-cost heating element that is affixable to a variety of temperature-sensitive devices.

SUMMARY OF THE INVENTION

According to one aspect of the invention, a device comprising a laminar body is provided. The laminar body includes a substrate having a first surface and a second surface. The laminar body includes at least one heating element disposed on the first surface. The heating element comprises a conductive layer that is patterned into at least two electrodes in a spaced relation to each other. The heating element also includes a resistive layer that includes a resistive material having a resistance that changes with temperature at a predetermined resistance temperature coefficient. The resistive layer is disposed to permit current to flow through the resistive material between the electrodes. The laminar body further includes at least one fluid-receiving location that corresponds to the location of the at least one heating element. The heating element is in thermal communication with the fluid-receiving location.

According to another aspect of the invention a method for concentrating and measuring microfluidic volumes is provided. The method includes the step of providing a laminar body that includes a substrate with a first surface and a second surface. At least one heating element is disposed on the first surface of the substrate. The heating element comprises a conductive layer patterned into at least two electrodes in spaced relation to each other and a resistive layer comprising a resistive material having a resistance that changes with temperature at a predetermined resistance temperature coefficient. The resistive layer is disposed between the electrodes to permit current to flow through the resistive material between the electrodes to generate heat. The laminar body also includes at least one fluid-receiving location that corresponds to the location of the at least one heating element. The heating element is in thermal communication with the fluid-receiving location. The method further includes the steps of placing a volume of fluid at the fluid-receiving location and providing an electronics component having at least signal detection circuitry and control circuitry connected to the at least one heating element. The method further includes the step of applying a voltage across at least one heating element. Another step is obtaining at least one electrical information from at least one of the heating elements. The electrical information is a function of the variable resistance of the resistive material. The electrical information of at least one heating element is monitored. At least one heating element is controlled based on the electrical information that is calibrated to correspond to a known fluid volume or temperature and the fluid volume or temperature is determined.

According to another aspect of the invention, a method for moving microfluids is provided. The method includes the step of providing a laminar body that comprises a substrate having a first surface and a second surface and at least one heating element disposed on the first surface. The heating element includes a conductive layer and a resistive layer. The conductive layer is patterned into at least two electrodes disposed in spaced relation to each other. The resistive layer comprises a resistive material having a resistance that changes with temperature at a predetermined resistance temperature coefficient. The resistive material is disposed between the electrodes to permit current to flow through the resistive material between the electrodes. The method includes the step of providing at least a first receiving location interconnected to a second receiving location. The heating element is located next to the first receiving location. The method includes the step of placing a volume of fluid in the second receiving location and placing a volume of gaseous fluid in the first receiving location. The method includes the step of heating the volume of gaseous fluid to expand and exert pressure on the volume of fluid in the second receiving location to move the volume of fluid in the second receiving location. The method includes the step of moving the volume of fluid.

BRIEF DESCRIPTION OF THE SEVERAL VIEWS OF THE DRAWINGS

The foregoing and other advantages of the invention will become apparent upon reading the following detailed description and upon reference to the drawings in which.

Figure 1:
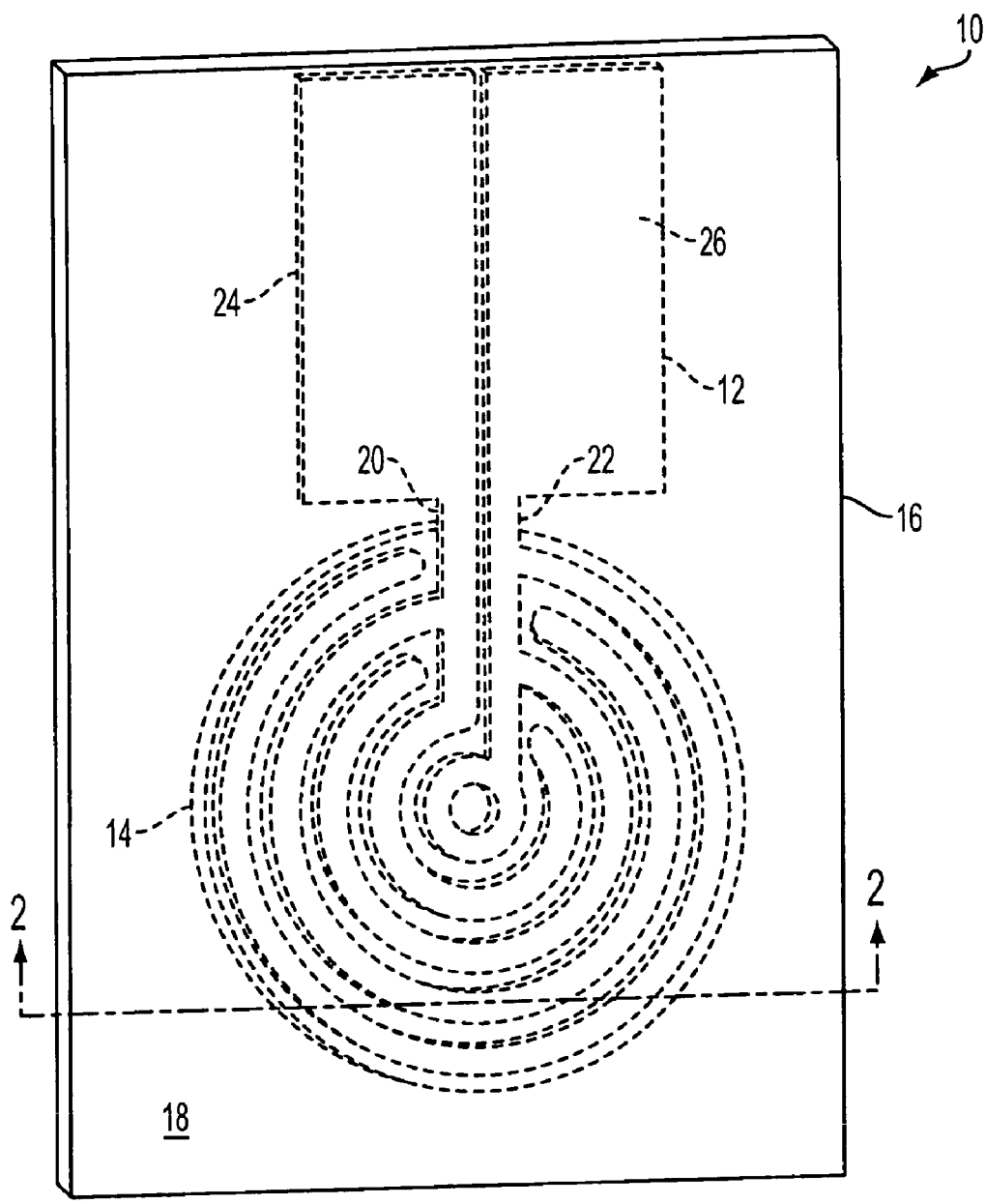
FIG. 1 is a perspective view of a device depicting a substrate, resistive material and conductive material according to the invention.

While the present invention is susceptible to various modifications and alternate forms, specific variations have been shown by way of example in the drawings and will be described herein. However, it should be understood that the invention is not limited to the particular forms disclosed. Rather, the invention is to cover all modifications, equivalents, and alternatives falling within the spirit and scope of the invention as defined by the appended claims.

DETAILED DESCRIPTION OF THE INVENTION

This application claims priority to U.S. Provisional Application Ser. No. 60/433,209, entitled "Method for heating microfluidic circuits and moving fluids", filed on Jan. 27, 2003, which is incorporated herein by reference in its entirety.

Figure 2:
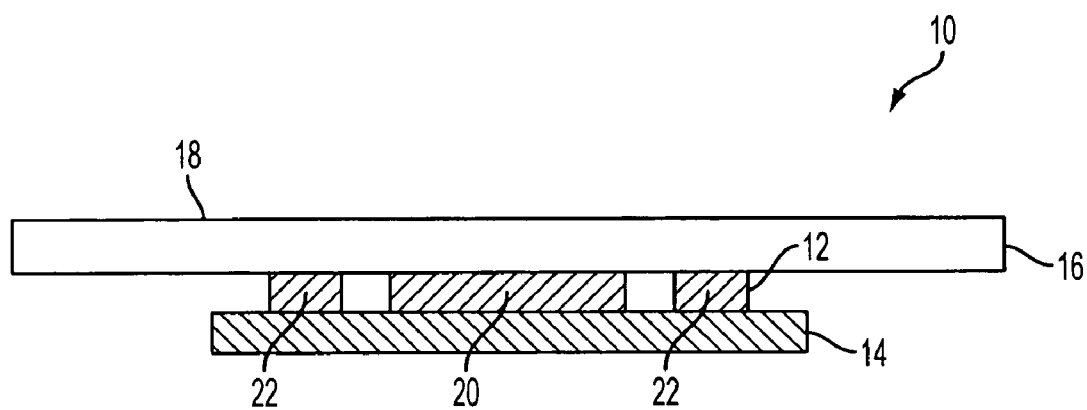
FIG. 2 is a side elevational view along cross-section 2—2 of FIG. 1 according to the invention.

A diagram of a device 10 according to the invention is shown in FIGS. 1 and 2. The device 10 of the invention comprises a conductive layer 12, a resistive layer 14 and a substrate 16. Typically, the conductive layer 12 which comprises a conductive material is formed on the substrate 16 and the resistive layer 14 which comprises a resistive material is formed on the conductive layer 12 as shown in FIGS. 1 and 2. Alternatively, the resistive layer 14 is formed on the substrate 16 with the conductive layer 12 formed on the resistive layer 14. In one variation, a second conductive layer and a second resistive layer is printed on the second side 18 of the substrate 16.

The substrate layer 16 is generally electrically non-conducting and made of any polymeric material known in the art to be suitable for the present application. The substrate material is selected to be easily formable from a planar geometry into a variety of shapes with little damaging distortion or stretching of resistive and/or conductive layers. The substrate material is also selected to be suitable for resistive or conductive material adhesion such that the resistive and conductive materials will not shed easily from printing, forming or flexure. With respect to adhesion, resistive and conductive materials are, in one embodiment, printable inks that typically contain solvent and require to be cured at high temperature. The curing process evaporates the solvent, but the substrate material should be substantially unaffected or degraded by the high temperature for its purposes to be later formed and flexed for example. Generally, the substrate is between 0.002 inches and 0.050 inches in thickness and flexible. A thinner substrate material provides greater heat transfer through the substrate when compared to a thicker substrate material with the thickness being selected accordingly for the given application.

Examples of suitable substrate materials are thermoplastics including polyester such as polyethylene terephthalate (PET). One example of a suitable polyester film is provided by General Electric Plastics under the trade name Valox PTX® 110 which is an optically clear and glossy polyester film with one side pretreated to promote ink adhesion. Another example of a suitable substrate material includes polycarbonate such as Bayer Corporations Macrofol product. Yet, another example of a suitable substrate material includes polybutylene terephthalate (PBT) such as that provided by General Electric Plastics under the trade name GE Valox FR1. Also suitable are PBT copolymers such as polycarbonate/polybutylene terephthalate (PC/PET) blends such as Bayfol provided by the Bayer Corporation. PET copolymers such as polycarbonate/polyethylene terephthalate (PC/PET) blends are also suitable such as Xylex™ provided by GE Plastics. Some materials are more suitable than others possessing characteristics more suitable for example for thermo-forming versus curing inks and can be selected accordingly so as to provide the optimum characteristic for a given application.

The conductive layer 12 comprises a conductive material. The conductive material is generally a printable conductive ink. In one embodiment, the conductive material includes a polymer such as a polyester resin mixed with conductive material such as silver flakes and a solvent. The mixture is kneaded into a paste suitable for use as an ink. However, any conductive medium such as copper, gold, nickel, other metals and metal alloys is employable in a similar mixture or as a different non-ink material. The conductive material is also suitable for withstanding thermoforming after application to the substrate. Examples of conductive materials in the form of inks that are useful according to the invention include Dupont 5000, 5025, 5028, 5096 and other equivalent commercially available conductive inks.

The conductive material is applied to the substrate in a variety of techniques available in the art. For example, the conductive ink is screen-printed using methods and techniques well known in the art; however, the conductive material can be applied by contact printing, gravure, etching, ink jet, photoresist technology, painting, spraying or other forms such as spread coating, casting, roller coating, spray coating, sputtering, curtain-flow coating, brush coating and dipping. After being applied, the conductive material is allowed to dry or is baked forming the conductive layer on the substrate in a thickness of approximately 2 to 20 microns.

The layers are formed in solid and/or intricately-patterned coatings to configure a variety of electrical circuits. Using these application methods, a two-dimensional array of virtually any combination of electrical characteristics which mimic any discrete electronic device such as resistors, capacitors, inductors, transistors and the like can be created. In addition, through holes can be created in order to facilitate routing of the circuitry. The circuits can be terminated in a variety of ways in order to facilitate the measurement of current, temperature, and power for example. Connections such as ZIF, surface mount, crimped, pin and socket or others can be used.

The basic arrangement of the conductive material is shown in FIG. 1 wherein at least two spaced-apart electrodes 20 and 22 are formed in the conductive layer as shown in FIGS. 1 and 2. The pattern of the electrodes in FIG. 1 is a circular pattern in which the electrodes 20, 22 are alternately interspaced in a concentric pattern. In one embodiment, the diameter of the circular portion of the electrodes is approximately 0.250 inches. The width of the conductive material in the pattern as measured parallel to the face of the substrate is approximately 0.010 inches and the tracers of conductive material are spaced apart in gaps, as measured parallel to the face of the substrate, of approximately 0.015 inches in width. Also, the electrodes are shown positioned and dimensioned that at all points, the distance between adjacent electrodes between which current passes, measured parallel to the face of the substrate are substantially parallel. However, the invention is not so limited and any circuit pattern is within the scope of the present invention. In particular, the invention is not limited to the shape, size and widths of the material and spacing but can be tailored for exhibiting a particular electrical behavior for a given application. In another embodiment, variation of the distance between electrodes need not be uniform and can be positioned and dimensioned if non-uniform conduction across electrodes is desired. The circular geometry allows minimum distortion of tracer spacing after the substrate is operation formed to produce dimples. Also, the circular geometry may induce concentric concentration of samples as will be disclosed hereinbelow.

In the embodiment shown in FIG. 1, the conductive layer also includes two contacts 24, 26 that are formed with the electrodes, 20 and 22, respectively for coupling the electrodes to a source of electrical current. The contacts 24, 26 are generally straight strips of conductive material.

Figure 3:
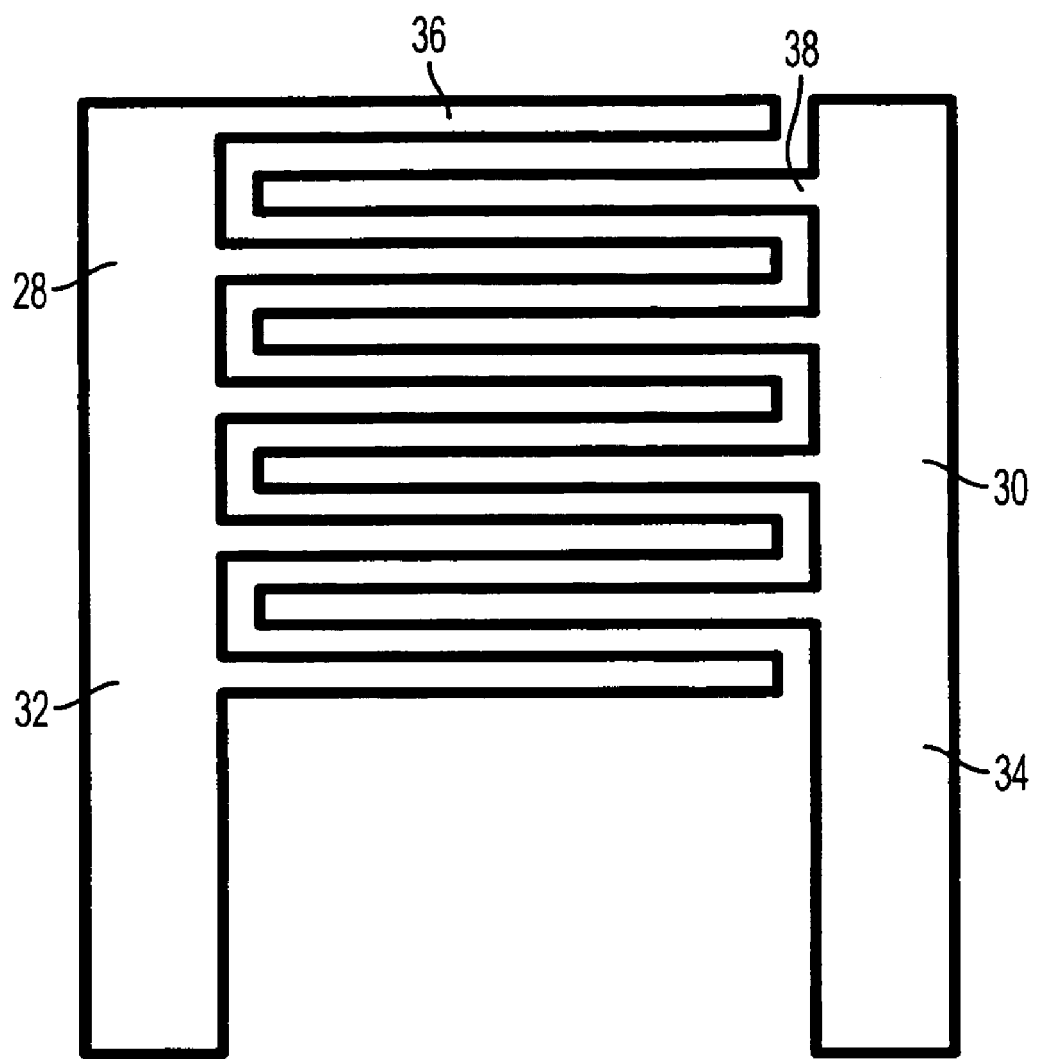
FIG. 3 is a top view of circuit pattern of the conductive layer according to the invention.

Another pattern in which the conductive material is printed on the substrate is shown in FIG. 3. FIG. 3 shows a polygonal pattern with two spaced-apart electrodes 28, 30. Each of the electrodes 28, 30 has a contact 32, 34, respectively. The contacts 32, 34 are substantially parallel. Interdigitated comb-like "fingers" 36, 38 associated with electrodes 28, 30, respectively, extend between the contacts. The "fingers" alternate and are spaced-apart to form gaps between adjacent fingers of opposite electrodes. As shown, the fingers 36 of one electrode 28 that are connected to one polarity of electrical current interdigitate in a comb-like pattern with the fingers 38 of the second electrode 30 formed in a comb-like pattern and connected to an opposite polarity of electrical current.

The size of the block of interdigitated fingers 36, 38 is 0.150 by 0.150 inches, 0.250 by 0.250 inches, 0.340 by 0.340 inches or 0.680 by 0.680 inches; however, the block can be any shape and size. The width of each finger is approximately 0.005 to 0.025 inches. The width of the gaps between adjacent fingers, as measured parallel to the substrate surface, is approximately 0.005 to 0.025 inches. The spacing between interdigitated traces determines in part the heating characteristics as resistive material will be located between the fingers bridging the electrical current. Heater function can be tuned by selecting trace spacing and geometry and, of course, the thickness of the resistance material. Any shape, dimension, or pattern is selectable according to the demands of the application and any number of heating elements can be formed.

The resistive layer 14 of FIGS. 1 and 2 comprises a resistance material. In one embodiment, the resistance of the resistance material varies with temperature. In on variation, the resistance material exhibits a positive temperature coefficient (PTC) of resistance behavior and is therefore, a PTC material. The resistance material is an ink suitable for printing. A PTC material increases in resistivity with an increase in temperature, and typically exhibits a sharp change in resistivity at a certain temperature, $T_s$, known as the switching temperature. In one embodiment of the invention, the PTC composition has a preselected switching temperature Generally, manufacturing a PTC material involves dissolving a crystalline polymer in a suitable solvent to form a single phase polymer solution, and dispersing electrically conductive particulate material in the polymer solution. Any suitable crystalline polymer is useful and may include crystalline polymers solvatable at ambient temperatures. Examples of polymers include crystalline polyurethane and choroprene polymers. Examples of solvents include acetone, methyl ethyl ketone, cyclohexanone, carbitol acetate, and solvent blends. The selection of the solvent and polymer will depend in part upon several factors such as method of application of the composition, cost, and evaporation rate. Many different kinds of conductive particles are suitable for forming a PTC composition, including metal powders such as silver, gold, nickel, powdered graphite, metallic carbides, high-structured carbon black and low-structured carbon black. The conductive particulate material is well-dispersed into the formulation to give the composition substantially uniform electrical properties. The resistive material can be any resistance material held in binder and which preferably can be applied by a printing technique. Also, the composition of resistance materials can also contain non-conductive fillers, including arc-suppression agents, antioxidants, and other auxiliary agents. Inks of the general type used are available from DuPont such as DuPont 7082, 7102, 7271, 7278, 7282 and 7285. Other equivalent commercially available PTC inks are also useful. Many such compositions are described in various patents and publications listed or disclosed herewith and are incorporated by reference herein.

The invention also includes resistance materials that do not exhibit PTC behavior. The specific resistance of the particle-binder mixture may be varied by changing the amount and kind of electrically conductive particles used. In addition to the amount of carbon black, the crystallinity of the polymer is an important factor to be considered with respect to its influence on the electrical characteristics of the composition as will be appreciated by one skilled in the art. The ratio of particulate matter to the type of polymeric binder can vary depending on the range of values of the resistance factor used in the device. Also, the amount of solvent affects resistance factor and heater function. The amount of solvent remaining in the composition can be tuned by partially curing the resistance material to target a desired resistance. The composition of the resistive material of the present invention is not restricted and can be selected from a wide range to meet particular physical and electrical performance requirements of the device.

Typically, the resistive material is applied on the conductive layer by screen printing or using any of the other methods described above with respect to the conductive layer. The conductive layer can be located on either side of the resistive coating as long as they are in contact. In FIG. 1, the resistive material is applied in a circular pattern between the electrodes and in contact therewith such that a current flowing through the electrodes passes through a substantial portion of the resistive material layer at a temperature at which the resistive material is conductive. In one embodiment, the resistive layer 14 is not applied onto the contacts 24, 26 as shown in FIG. 1. In FIG. 3, the resistive material is applied in a polygonal pattern between the electrodes and in contact therewith such that a current flowing through the electrodes passes through a substantial portion of the resistive material layer at a temperature at which the resistive material is conductive. In one embodiment, the resistive layer is not applied onto that portion of the electrodes 28, 30 that form contacts 32, 34 as shown in FIG. 3.

After the resistive layer is printed, it is then baked at a prescribed temperature for a prescribed time to form a resistive layer. The resistive layer is approximately 2.0–20.0 microns thick as measured perpendicular to the face of the substrate. Repetitive screen printing of resistive inks can be used to deposit thicker layers having reduced resistances. Generally, the thickness is selected so that the resistance recovering characteristics from a high temperature is not degraded and so that the solvent is completely evaporated in order to avoid any resulting instability in resistance characteristics. The thickness of the resistive layer affects heater function such that a thicker layer generally results in a lower resistance and more heat/power. The ability to tailor the resistance and hence, temperature profile of the resistive heaters using choice of ink formulation and printing/dimensioning of the circuit advantageously provides control of the final electrical and thermal properties of the device when in operation.

In one embodiment, a contact layer (not shown) of material with heat resistance and good thermal conductivity is applied to sandwich the resistive and conductive layers between the contact layer and the substrate either before or after the second forming operation. In another embodiment, an additional second contact layer is applied to sandwich the resistive, conductive and substrate layers between the first and second contact layers. The contact layer serves to insulate the electrical circuit and to prevent oxidation and water or any other electrolyte from contacting and bridging the electrodes and therefore avoids the possibility of short circuits between the electrodes and consequent sparking and burning of the laminar element. Contact layers advantageously comprise dielectric inks such as Dupot 5018A. Insulation can also be achieved using pressure sensitive transfer adhesives or thermoplastic bonding films. In one embodiment, the contact layer is a microfluidic circuit comprising, chambers, conduits, channels and the like for handling and processing microfluids wherein temperatures are precisely controlled for a variety of applications.

The resulting laminar heating device 10 is very thin, approximately, 135 to 300 microns thick. This feature enables the device to be mass produced and simply tailored to suit the needs of the user. The present invention provides a flexible, formable, and easily produced electrical heating device. It can be shaped and cut to accommodate the needs of the user. The laminar element can be formed into a non-planar element by a number of processing including insert molding, converting methods that often involve sheets, films, or tapes that can be handled in a continuous or semi-continuous manner. The continuous tapes can result in the production of thousands to millions of discrete devices using converting processes such as cutting, lamination, printing, and dimpling. The raw materials that are fed into the converting process are often flat. Structures such as wells, channels and chambers can be formed using multiple layers of flat films or by distorting the flat film for example by dimpling and vacuum forming. Although printing the circuit prior to forming has been described, the invention is no so limited and printing or forming circuits can be performed subsequent to forming reservoirs and other shapes in the laminar device. In some cases, printing onto a shaped portion of the laminate after the shape has been formed is advantageous. This can be done, for example, by contact printing directly onto the shape.

Figure 4:
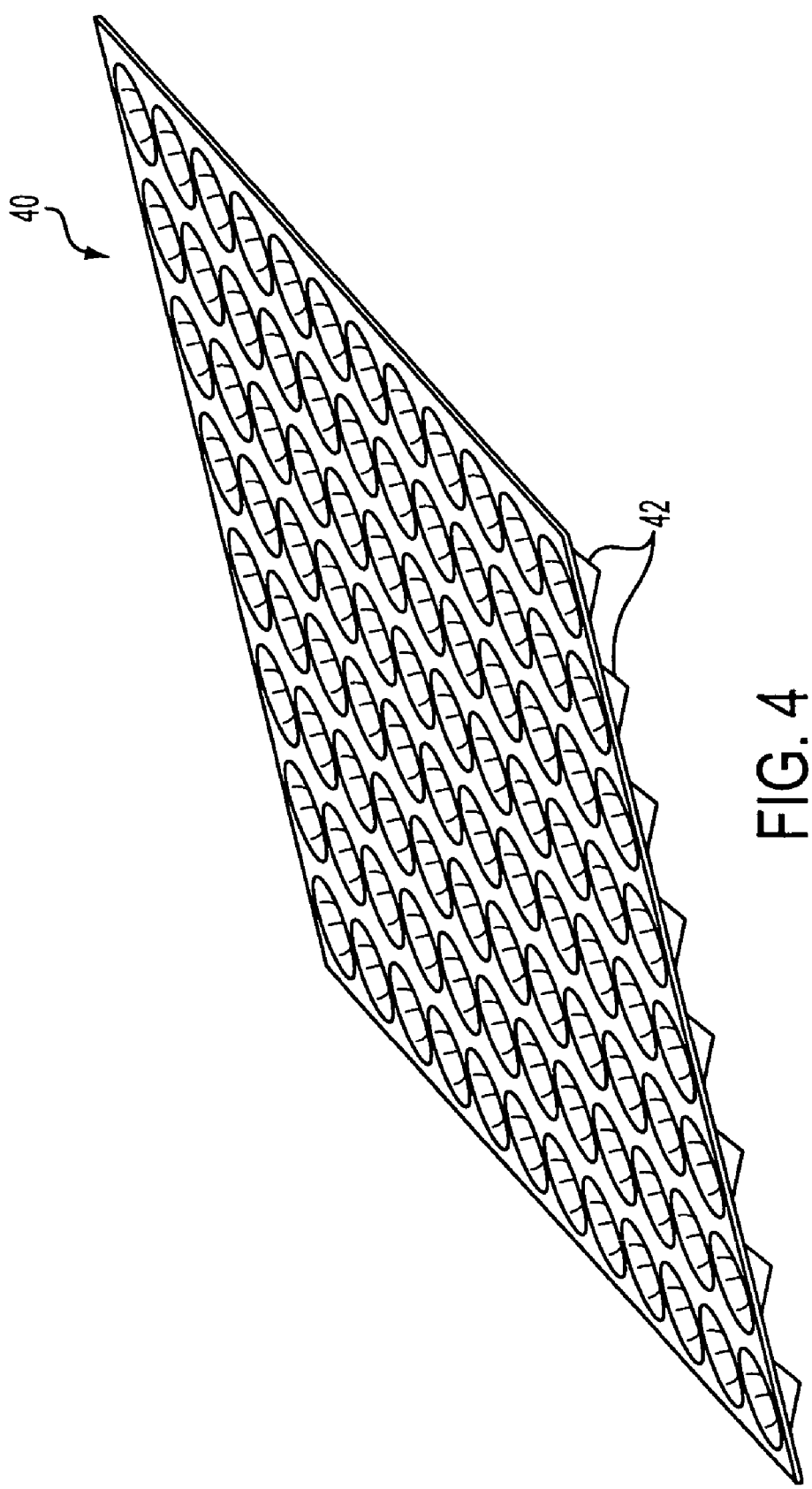
FIG. 4 is a perspective view of a laminar element having cone-shaped dimples according to the invention.

Referring now to FIG. 4, the laminar element 40 is formed with a plurality of dimples 42. In one embodiment, the dimples 42 are cone-shaped and thermoformed in alignment with or next to the circular-shaped pattern for electrodes as depicted in FIG. 1. However, the invention is not so limited and dimples of any shape and depth can be formed with any pattern of conductive and resistive material. During the forming process there may be some deformation of the conductive and resistive layers; however, this distortion is minimized by forming dimple geometries that are more compatible and result in less distortion when formed with a particular circuit pattern. The cone-shaped or "drill-bit" dimple is approximately 0.250 inches in diameter and approximately 0.100 inches in depth as measured from surface of the substrate to the tip of the dimple. The cone-shaped or "drill-bit" dimple is aligned with the center of the circular-patterned electrodes that have a diameter of 0.250 inches. In another variation, the cone-shaped dimple is between approximately 0.187 to 0.300 inches in diameter and approximately 0.05 to 0.30 inches in depth.

Figure 5:
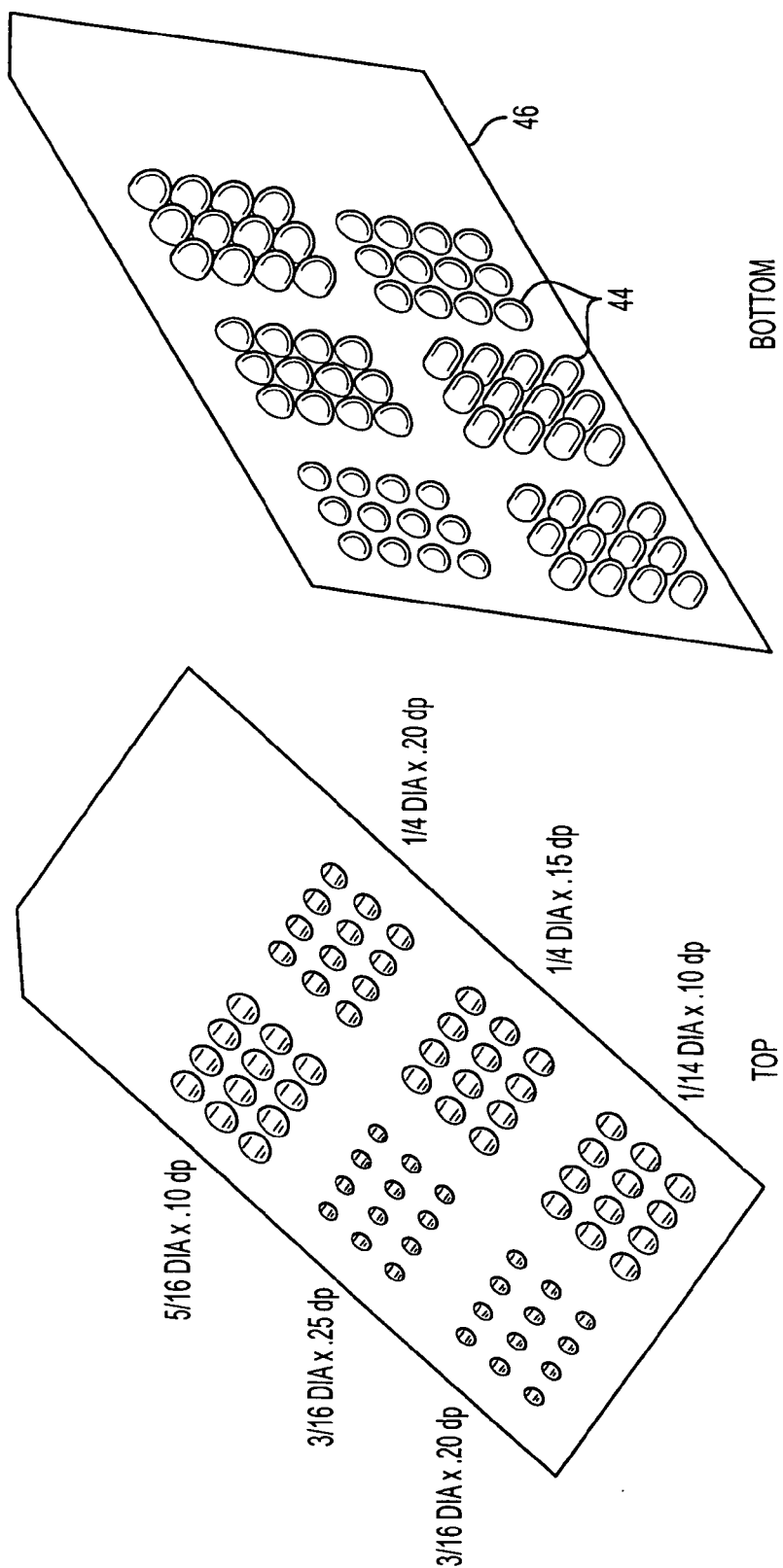
FIG. 5 is a perspective view of a laminar element having spherically-shaped dimples according to the invention.

In another embodiment shown in FIG. 5, the dimples 44 of the laminar body 46 have a spherical geometry. The spherically-shaped dimples are thermoformed in alignment with or next to the circular-shaped circuit pattern of the type depicted in FIG. 1. The spherically-shaped dimple is approximately 0.250 inches in diameter and approximately 0.100 inches in depth as measured from surface of the substrate to the tip of the dimple and formed in alignment with the center of the circular patterned electrodes having a diameter of 0.250 inches. In another variation, the spherically-shaped dimple is between approximately 0.187 to 0.300 inches in diameter and approximately 0.05 to 0.30 inches in depth.

The dimples serve as receptacles for receiving fluid and locating fluid in thermal communication with and next to the circuit. Fluid is placed directly into a dimple. In one embodiment, the interior of the dimple is formed on the surface opposite to the surface on which the circuit is printed. In another embodiment, the interior of the dimple is formed on the same surface as the surface on which the circuit is printed. In the later case, a contact layer or second body is overlaid on the laminar body to prevent shorting out the circuit. In another embodiment, the plurality of dimples is formed having a pitch of approximately 9 mm between adjacent dimples.

Figure 6:
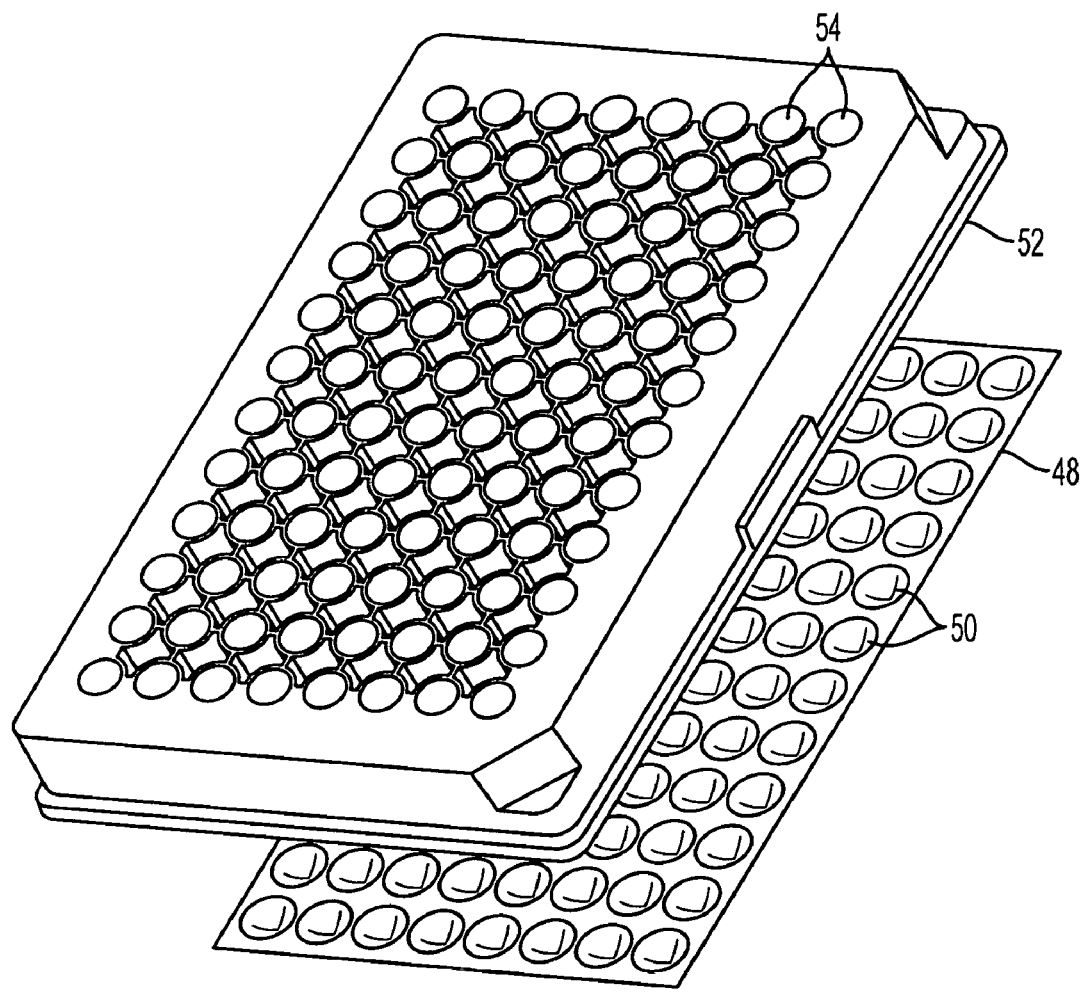
FIG. 6 is an exploded view of a laminar element and a second body according to the invention.

In one variation, the laminar element 48 with formed dimples 50 is placed in thermal contact with a second body 52 having a corresponding plurality of receptacles or chambers 54 as shown in FIG. 6. Basically two bodies, one being the laminar heating element 48 and the second body 50 being a fluid-receiving surface. In another variation, the second body is configured into a microfluidic circuit containing reservoirs, conduits or channels. In one variation, the second body is shaped with one or more geometries and the laminar heating body is planar. In another variation, both the laminar heating body and the second body are shaped to define corresponding channels and reservoirs. Of course, one or more heating elements alone or printed in series can be placed in thermal communication with a channel or any other structure or geometry and, of course, the second body may be planar.

In one variation, the laminar body is placed into a mold and integrally formed with a second body by a process known in the art as in-mold decorating (IMD) which is commonly used in automobile interior trim and hand-held electronics. Materials that can be used for the combined laminate, including the second body, include plastics, polymers, thermosets, thermoplastics, metals, papers, glasses, ceramics or composites containing more than one of these materials. It is often useful to use at lease some materials which are flexible, and therefore, can be processed in roll form, allowing continuous processing.

Figure 7:
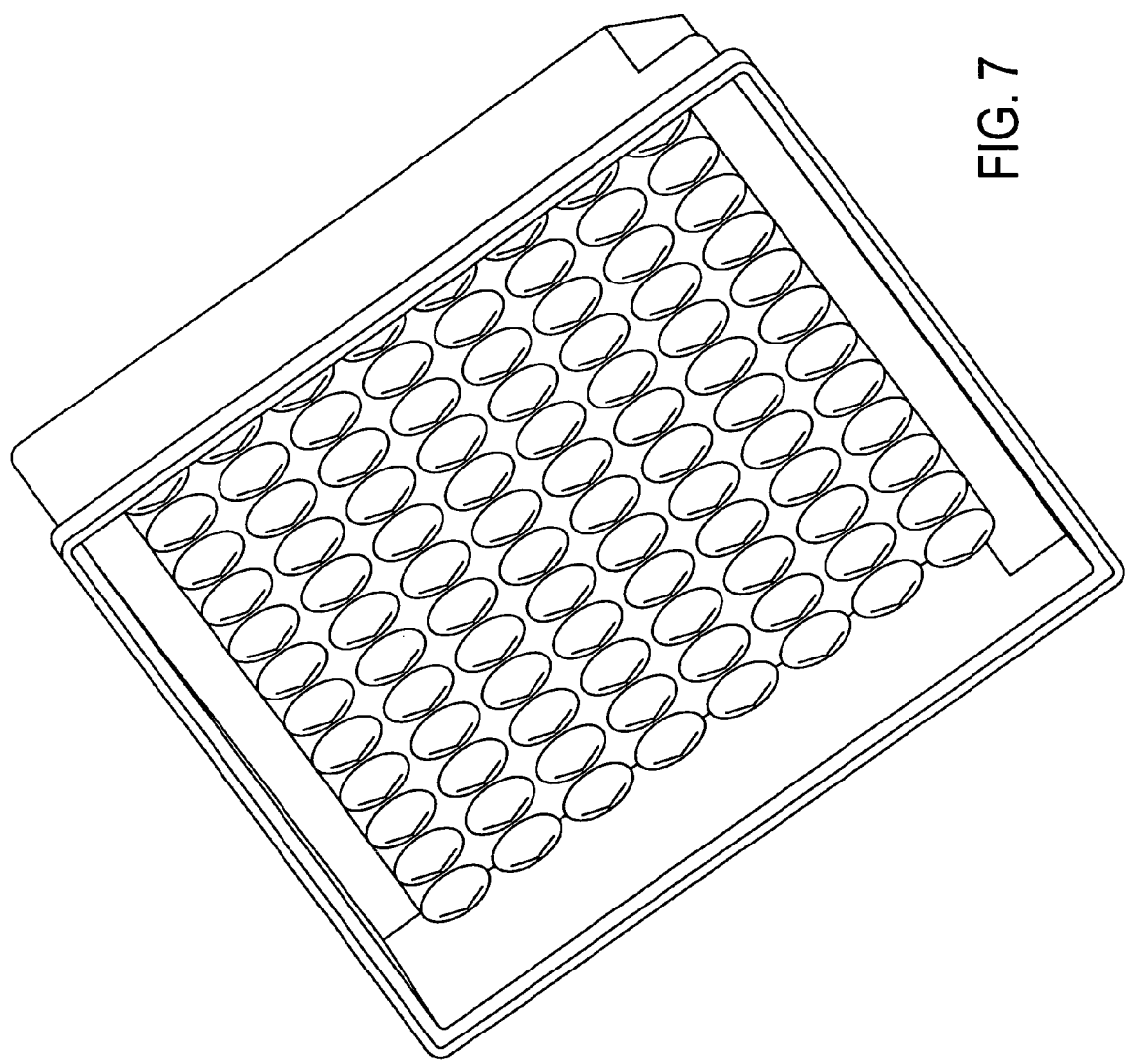
FIG. 7 is a perspective view of a laminar element and a second body according to the invention.

With in-mold decorating the laminar element serves as an insert that is embedded into a second body. The laminar element is typically pre-formed with dimples or other geometries prior to insertion into a mold cavity. In one variation, the printed circuit pattern on the laminar element is printed such that the desired pattern is distorted according to the geometry to be formed such that the distorted pattern reaches a desired pattern when a particular geometry is subsequently formed in the laminar element. Liquid resin, such as a polycarbonate/polybutelyen terepthalate blend by the trade name GE Xenoy, is shot behind the inserted laminar element, bonding the surface of the laminar element to the molding resin and forming a finished integral part. The result is a durable in-mold heating element that is in excellent thermal contact because it is an integral component of the molded assembly. No dust or other particles can come into contact with the circuit to affect it or scratch and damage the layers. The most common resin materials for the assembly include polycarbonate, SAN, Cycoloy, PVC, nylon, ABS, styrene, acrylic, polypropylene, polyethylene and polystyrene. Other processes are employable to place the laminar element in thermal contact with a second body. The invention is not limited to forming a micro-well plate with an integral heating element as shown in FIG. 7. Any geometry is within the scope of the present invention. For example, the laminar body can be formed into a microcentrifuge tube or microfluidic circuit containing any shape channel, conduit, chamber and reservoirs. In the case of a micro-well plate, a plurality of leads are connected to the electrodes of each resistance heating element circuit individually in a "bed-of-nails" contact scheme for multiple heaters in a small area and thereby controlled separately. Alternatively, the entirety of micro-wells is connected with a common bus bar with one contact and controlled as a single unit. This construction advantageously provides intimate contact with the heating element and a short distance between the heating element and the fluid to be heated. The device can be made to have a low thermal mass resulting in low power usage. A power source for applying a voltage across the heating element or elements is connected to the electrodes. Control of the power source is carried out by an appropriately programmed controller, such as a computer, microprocessor, or microcontroller in an external instrument.

In one variation, the heating device according to the invention includes an electronics component. The electronics component may include signal detection circuitry. The signal detection circuitry may detect electrical fields, electrical current, temperature, conductivity, resistivity, magnetic fields, dielectric constant, chemical properties, pressure, or light, depending on the operational requirements of the device. The techniques utilized for detection of these properties are known in the microfluidics and electronics art. It should be understood that circuitry for detecting other phenomena may also be included within the electronics component.

The electronics component may also include signal processing circuitry. For example, the signal processing circuitry may amplify a signal, filter a signal, convert a signal from analog to digital, and make logical decisions based upon signal inputs. Because the possibilities for signal processing are numerous, it should be understood that any type of signal processing is anticipated for implementation in the electronics component.

The electronics component may also provide circuitry for control functions such as voltage control, current control, temperature control, clock signal generation, etc. For example, the electronics component may convert power incoming to the system at 15 volts into 5 volts for utilization by the electronics component. The electronics component may also be utilized to create certain desired signals, such as sinusoidal signals. Flow control circuitry may be incorporated in order to manipulate microfluidic flow control elements of various types such as valves, pumps, and regulators. As with the detection and processing circuitry, the possibilities for control circuitry are numerous and therefore it should be understood that any type of control circuitry is anticipated for implementation in the electronics component.

The electronics component may also contain software or firmware that, through its operation, guides or controls the action of the circuitry. For example, the electronics component may contain programmable logic which allows a programmed algorithm to be executed so as to perform certain functions. These functions may include signal filtration, signal feedback, control operations, signal interruption, and other forms of signal processing. The controller may be programmed to take a chamber or chambers of the microwell plate and fluid deposited therein through any number of predetermined time and temperature profiles by varying the amount of power supplied to one or more laminar heating elements.

In the case where the resistive layer comprises a PTC composition, the resistive layer will be conductive at temperatures below its switching temperature, $T_s$. Below $T_s$, current flowing through the electrodes passes through a portion of the resistive element thereby heating the element and chamber and any fluid deposited in the chamber that is in thermal contact with the element. Above $T_s$, the increase in resistance is typically sufficiently high that the heating element is effectively converted from an electrical conductor to an electrical insulator by a relatively limited increase in temperature. When the temperature reaches the preselected switching temperature of the PTC composition, the conductivity changes precipitously to a low conductive state typically at a temperature near the characteristic crystalline melt temperature of the crystalline organic chemical. The resistive layer is no longer conductive in this state and the current ceases to flow causing the heating to stop. When the resistive layer cools to below the switching temperature, the polymer of the resistive material becomes crystalline and the resistive layer reverts back to a high conductivity state until it again reaches the switching temperature. The device continuously cycles in this manner. A further practical requirement for most PTC materials is that they should continue to exhibit useful PTC behavior with $T_s$ remaining substantially unchanged when repeatedly subjected to thermal cycling.

Accordingly, the switching temperature of the PTC material is preselected by selecting the switching temperature of the resistive material and thereby to control the temperature at which the element self-regulates such that the temperature of the chamber remains at the desired temperature. Since, in part, ambient conditions affect the temperature-dependent behavior of the heating element, the ambient conditions can also be adjusted such that the temperature of the chamber remains self-regulated at a desirable temperature. For example, a vacuum can be applied to the chamber as a means for regulating ambient pressure.

Figure 8:
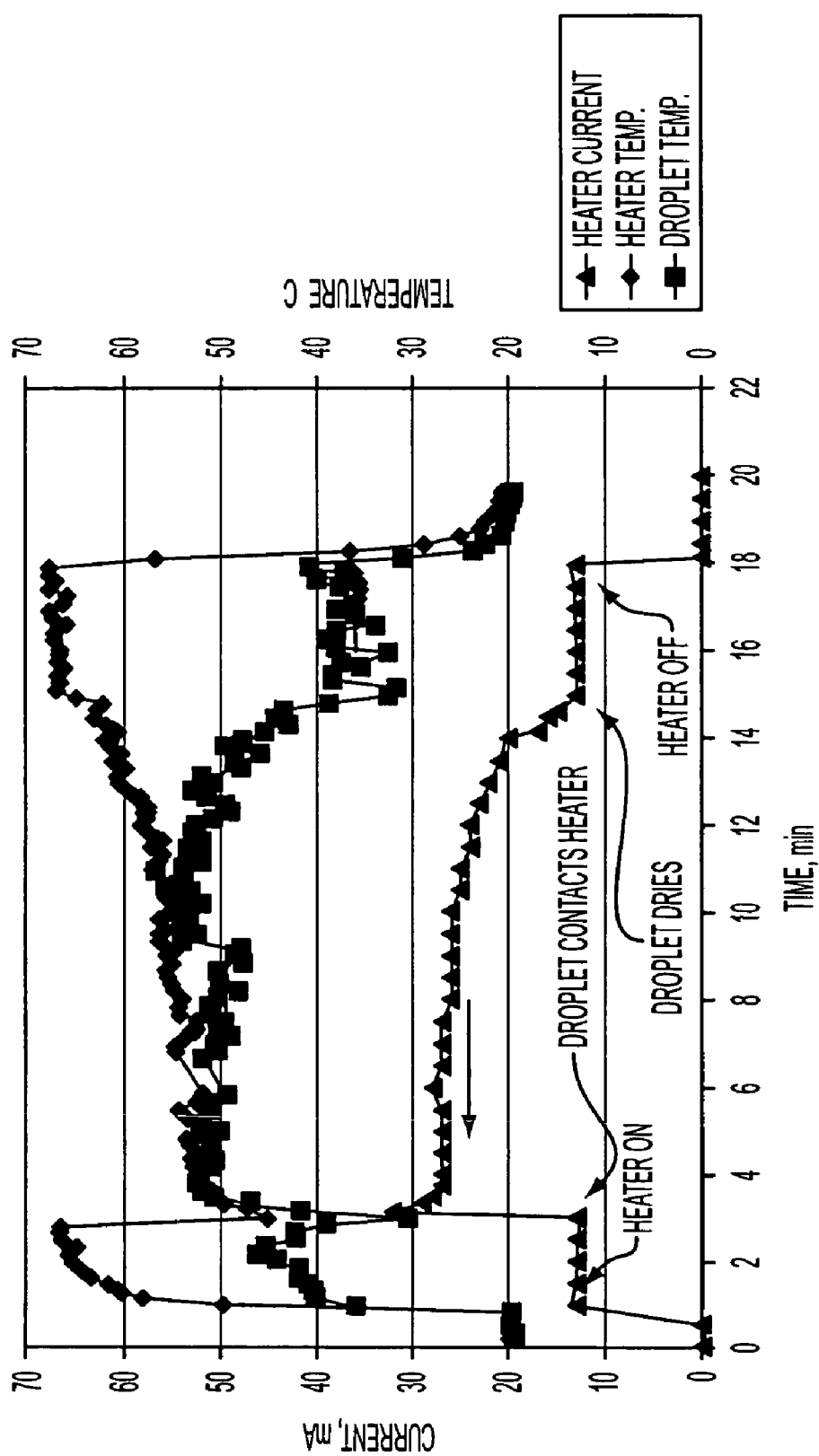
FIG. 8 is a graph of electrical current and temperature behavior over time of a device according to the invention.

The behavior of a PTC resistive layer having a switching temperature above 70° C. is shown in FIG. 8. Referring now to FIG. 8, with no voltage being applied to the element, the temperature of the element is approximately 20° C. and the pressure of the chamber is at approximately 760 torr. When 12 volts are applied after approximately one minute, current begins to flow through the device at approximately 12 mA and the device temperature increases to over 60° C. When 50 µL of water is placed in the chamber, the chamber is cooled to approximately 45° C. With this cooling, the resistive material becomes more conductive and as a result there is a spike in current to approximately 30 mA. The resistive layer and the droplet begins to gradually increase in temperature and the current settles to a plateau of about 27 mA after the spike before returning to its original baseline current of 12 mA that was measured before the droplet was placed into the chamber. At the point when the current returns to the original 12 mA, the 50 µL of water has completely evaporated.

In an embodiment in which the thermal cycling is below the switching temperature as described above with respect to FIG. 8, the current, for example, can be detected using detection circuitry of the electronics component. As such, the laminar element serves as a temperature control device such that the current is calibrated to a corresponding temperature under a constant voltage as shown in FIG. 8. In other words, the heater element resistance is a function of temperature so this property can be used to measure temperature. Also, the electronics component can used to vary the current to control temperature or measure a fluid volume. For example, the amount of power required to raise the element to a specific temperature will be determined by how much evaporative cooling is occurring which is a function of how much liquid is in thermal contact with the resistance material of a heating element. Measuring the differential power required to keep the element at a specific temperature provides a measure of how much liquid is one the element.

The heating element also functions as a sensor wherein a particular electrical current is calibrated to correspond to a particular temperature. This temperature can be calibrated to correspond to the temperature of the resistance material, the temperature of the chamber, or the temperature of a particular fluid under given ambient conditions. As a sensor, the laminar element need not function as a heater. For instance, once the electrical current is detected and a temperature output received from the electronics component, the voltage supply to the circuit can be removed or the circuit interrupted such that the resistance material does not substantially heat the fluid volume.

Alternatively, a device combining two heating elements such that one serves as a heater and such that another, which is electrically connected to the first, serves as a temperature sensor. In such an embodiment, a controllable heating element is printed within or adjacent to a region for thermal control of a fluid volume. The temperature controlled region also includes a similar heating element serving as a temperature sensor for monitoring temperatures and thereby controlling the application of current across the heater such that thermal control of the fluid volume is carried out by varying the current supplied to the heater to achieve the desired temperature for particular fluid volume. A wide variety of sensors are available for determining temperatures may also be used. In such a system, the controller, power source, heating element and temperature sensor may form a closed loop temperature control system for controlling the temperature of a chamber or fluid volume. In another embodiment, circuits are printed on opposite sides of the substrate. In one example, a heating element is printed on one side of the laminar layer and a sensing element is printed on the other side of the laminar layer. If current (heat) is supplied at one side of the microfluidic device, the temperature on the other side will be highly dependent on whether or not fluid is present.

In another embodiment, the heating element functions as a combined temperature sensor and heating element to provide heating and temperature control of a fluid volume. The device is useful for temperatures above ambient such that applied current would provide heat to raise the fluid temperature above ambient. Ambient temperature refers to the temperature surrounding the device locally and may be different than the temperature of the room that the device is in. The electronics component detects and monitors any electrical signal, such as current, resistance or temperature through its detection circuitry and provides a signal that is calibrated and used to control the temperature of fluid volumes within the device. In one embodiment, an electronic bridge circuit such as a Wheatstone bridge is used. The bridge circuit monitors the resistance of the device, for instance, by measuring the current through the device at a known voltage. The bridge circuit has a supply of voltage coupled across two opposite terminals. The remaining two terminals, which thereby carry the bridge output, are coupled to the inputs of an operational amplifier, for example. Two adjacent arms of the bridge are comprised of two resistors whose ratio determines a bridge constant for balancing the bridge. Of the two remaining arms of the bridge circuit, one includes a third resistor and the other includes a resistive heating element having a positive temperature coefficient. When heat is conducted away from the vicinity of the heating element, the heating element cools, and its electrical resistance decreases, thereby unbalancing the bridge. Through appropriate electronic circuitry, the condition of unbalance causes a relatively large heating current to flow through the heating element, causing the latter to generate more heat, until the resistance of the heating element again reaches the point where the bridge is in balance. The bridge constant can be preselected by using a variable resistor for example calibrated for a "dialed-in" desired temperature. Also, the voltage supply can be adjusted to a desired current across the heater element resistor and hence the temperature at the heater. A controller is programmed to adjust the amount of power supplied to the heating element in dependence upon the resistance of the heating element resistor. The signal measured at the bridge will typically be input to a processor or microcontroller which is programmed to receive and record this data. The same processor will typically include programming for instructing delivery of appropriate current for raising and lowering the temperature of the region of interest. For example, a processor may be programmed to take the interactive region through any number of predetermined time/temperature profiles such as thermal cycling for polymerase chain reactions (PCR) and the like. Given the small size of the device and reservoirs, cooling of an interactive region of interest will typically occur through exposure to ambient temperature. The vacuum to which the reservoir is subjected may also be controlled to control the rate of evaporation. However, additional cooling elements such as coolant systems, Peltier coolers, water baths, heat pipes and the like may be included if desired. An error signal can be used to stabilize the temperature of the heater by feedback control. Thus, the device serves as both a temperature sensor and as the heating element. The circuit does not directly measure temperature, but rather "sees" only the electrical resistance of the heating element or current differential.

In some cases, it is desirable to control the temperature to within one degree centigrade and sometimes within less than a tenth of one degree centigrade as in microfluidic applications. In other cases, it is only desirable that the temperature be controlled to within about 10 degrees centigrade. The invention can accommodate all of these ranges of temperature control depending on the design. In cases where a fine level of temperature control is needed, other factors such as, the ambient temperature and the rate of heat loss to ambient, are controlled. For example, the rate of heat loss from the device can be controlled with the use of insulating materials surrounding the device.

The use of a PTC material advantageously prevents and/or reduces the formation of hot spots in the following manner. When hot spots begin to form on the edges of a coated electrode due to current concentration, the resistance of the resistive layer at the electrode edges increases, resulting in a reduction in current flowing to and through these hot edges with an ultimate decrease in temperature of the edges and any material in contact or near the edges.

Furthermore, the heating element is suitable for fluid concentration. For example, the invention provides a device for concentrating the analyte into a volume of elution fluid smaller than the original sample volume. The desired analyte may comprise, e.g., organisms, cells, proteins, nucleic acid, carbohydrates, virus particles, bacteria, chemicals, or biochemicals.

As shown in FIG. 8, evaporation of a fluid volume to dryness results in the electronics component detecting a return to a baseline, or preselected current across the PTC material. Under conditions of ambient pressure of 760 torr, a square circuit pattern dimensioned 0.250 by 0.250 inches with a trace width of 0.010 inches and a gap width of 0.020 inches and a resistive layer of DuPont 7283 approximately 7 microns thick, all printed on a PET substrate of 0.010 thickness 50 µL of distilled water completely evaporated after approximately 12 minutes. The current or resistance across the resistive body is calibrated for volume measurement of a particular fluid such that at a certain reading of current, temperature, or resistance across the circuit, the fluid is known to have been concentrated to a certain preselected. In this variation, a single heater element is used to concentrate a fluid volume in a chamber or reservoir of the device.

In addition to heating and concentrating fluids, the invention also is used to measure the volume of fluids. One way of measuring fluids with the invention relies on the fact that the heat capacity of a region of the device is highly dependent on whether it contains fluid or air. A resistive circuit is printed on a region of the device below a channel or reservoir and the amount of current needed to raise the temperature of the region will be strongly dependent on the presence of fluid. A measurement of fluid is provided with a single resistive element printed on a film.

Figure 9A:
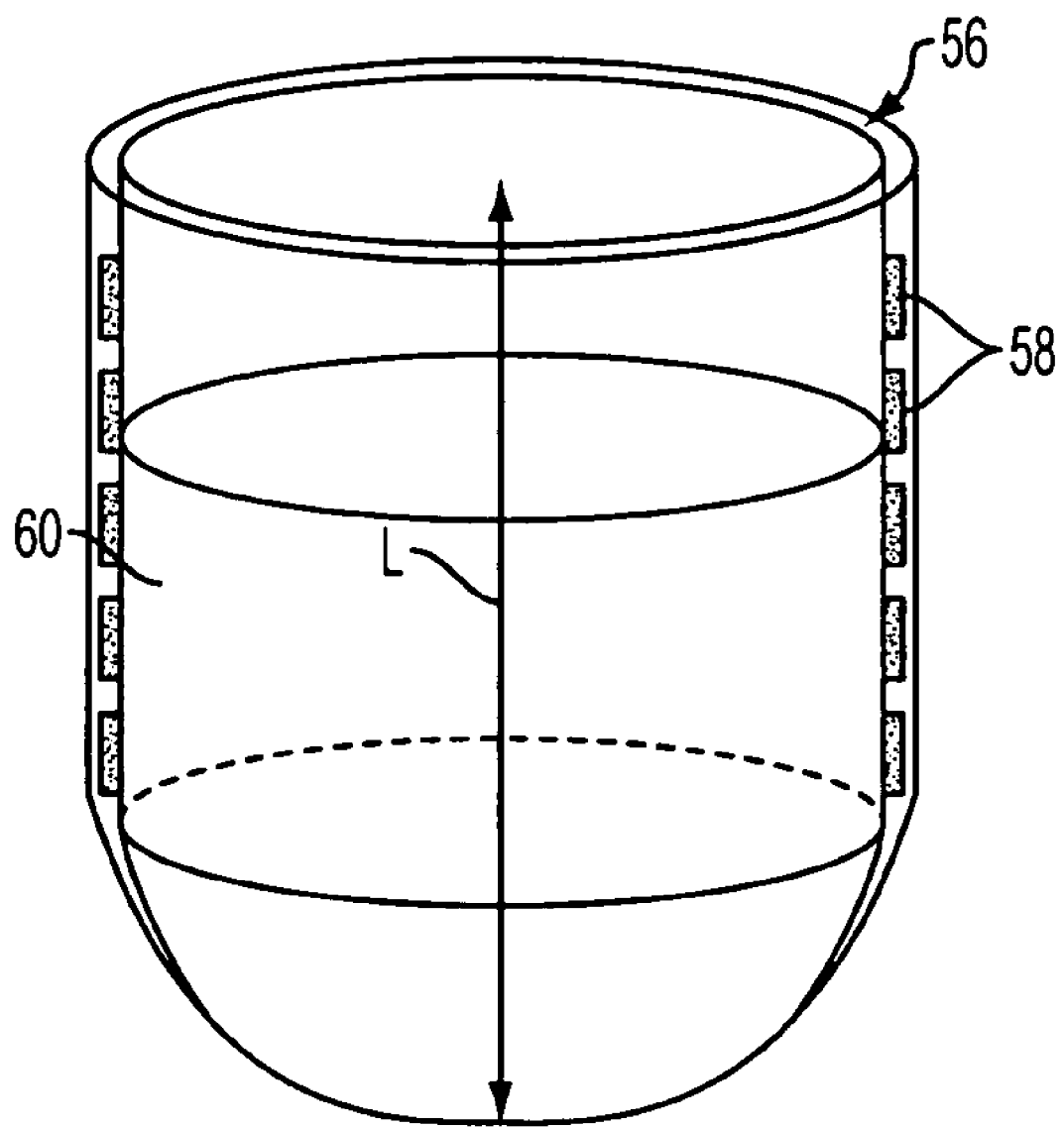
FIG. 9a is a side view of a reservoir with one or more heating elements according to the invention.

In another variation, multiple heating elements are configured to accurately measure fluid volume and/or to concentrate a fluid to a desired volume. As shown in FIG. 9a, one or more heater elements 58 are formed in a circuit that is in thermal contact with a single reservoir 56. One or more heater elements 58 are formed at least along one portion of the reservoir at known distances corresponding to known fluid volume graduations. In one variation, one or more heater elements 58 are formed along at least a portion of the entire length L of an outer surface of a reservoir or other structure formed in the laminar heating body. For example, in FIG. 9a, heater elements 58 spaced at known reservoir volume graduations are shown located on a reservoir 56 having a spherical geometry. When a volume of fluid 60 is deposited in the reservoir 56, a change in resistance of the PTC body will be detected by the detection circuitry in those heating elements that are in thermal communication with the fluid. Depending on which of the one or more heater elements 58 are so triggered or not triggered, the volume of fluid 60 in the reservoir is determined. The device of FIG. 9a can also be used to concentrate a volume of fluid in the reservoir 56 to a desired volume by activating one or more of the heating elements 58 to heat the chamber 56 and evaporate the fluid until a desired volume of fluid is reached as indicated by a detected electrical signal such as a resistance or current reading against the known graduations.

Figure 9B:
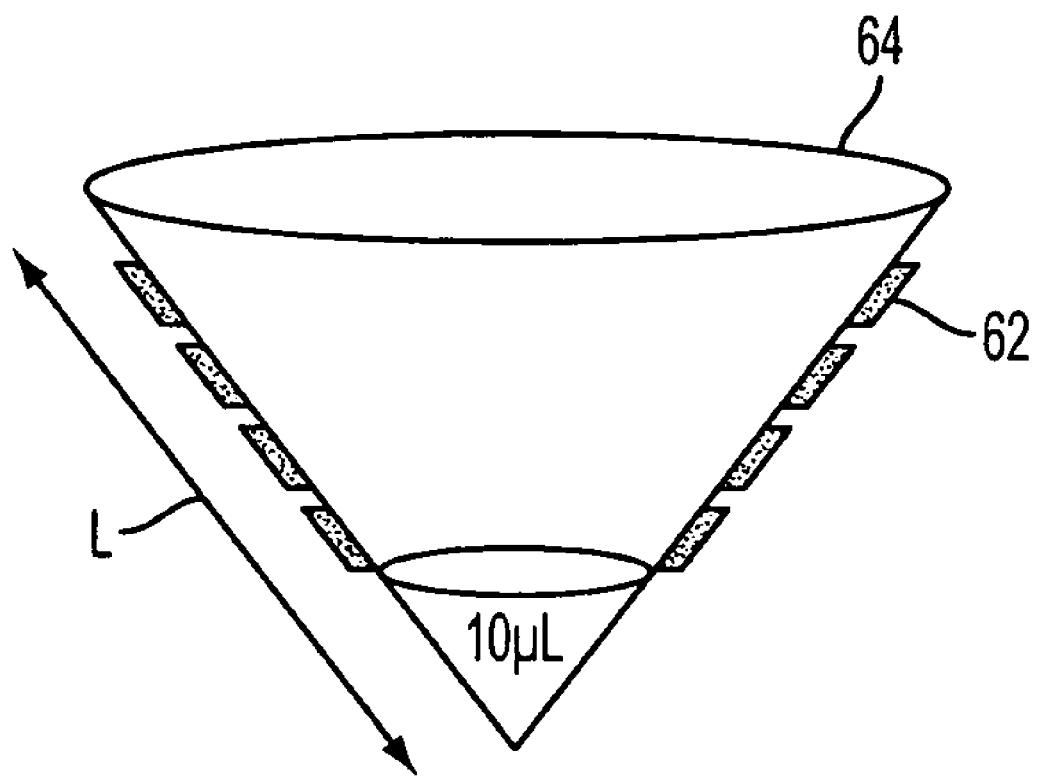
FIG. 9b is a side view of a reservoir with one or more heating elements along at least a portion of the reservoir surface according to the invention.

In FIG. 9b, there is shown one or more heater elements 62 that are spaced at or above a known graduation of reservoir 64 volume. For example, the known graduation above which the one or more heating elements 62 are located is 10 μL. When a volume of fluid is deposited in the reservoir 64, a change in resistance of the PTC body will be detected by the detection circuitry in those heating elements that are in thermal communication with the fluid volume. Depending on which of the one or more heater elements 62 are so triggered or not triggered, the volume of fluid in the reservoir 64 is determined. From there, the device of FIG. 9b can is used to concentrate a volume of fluid in the reservoir 64 to the desired graduation by activating the at least one or more heating elements 62 until a detectable electrical signal such as the current or resistance indicates that fluid is not in thermal communication with any of the one or more heating elements 62. The reservoir 64 having a cone-shaped geometry is shown for exemplary purposes only and is not intended to be limiting.

Figure 10A:
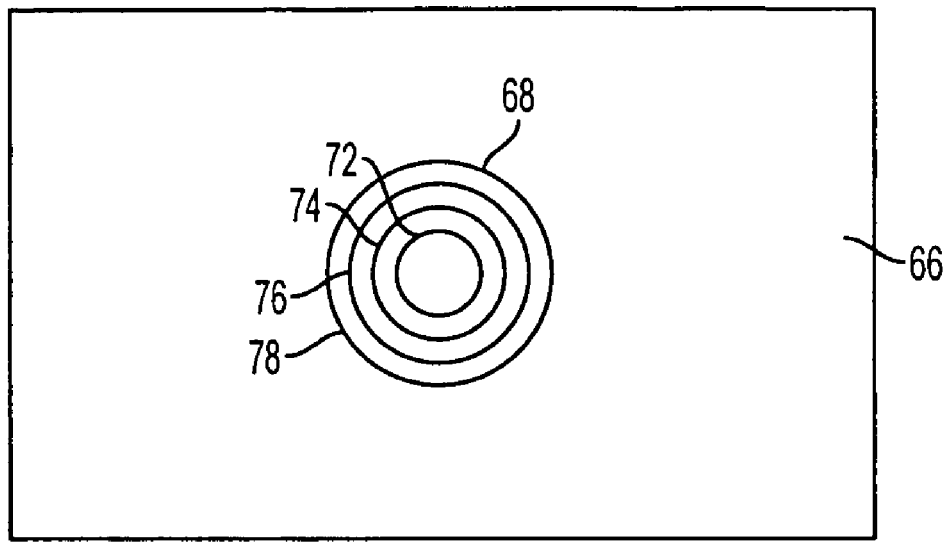
FIG. 10a is a top view of one embodiment of a laminar body having one or more heating elements arranged in a concentric pattern according to the invention.
Figure 10B:
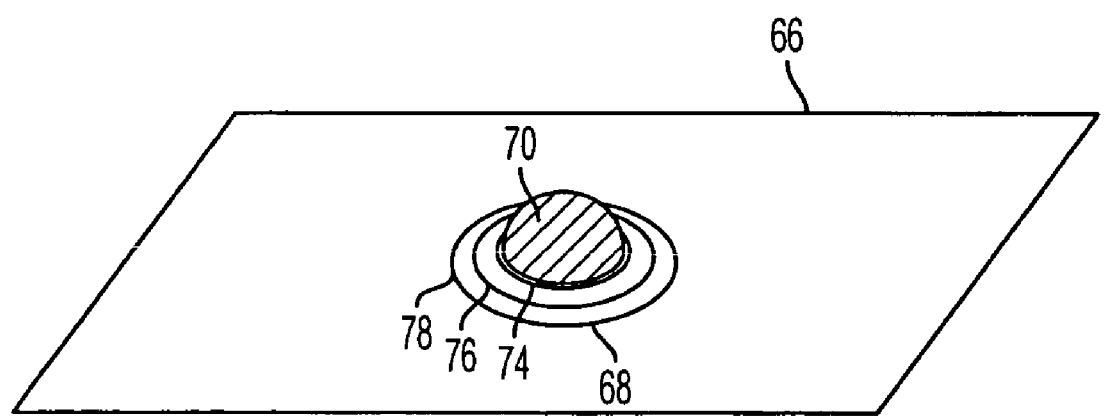
FIG. 10b is a perspective view of a drop of fluid on one embodiment of a laminar body having one or more heating elements arranged in a concentric pattern according to the invention.

FIG. 10a shows a top view of an embodiment of a laminar body 66 having one or more heating elements 68 arranged in a concentric pattern and FIG. 10b shows a perspective view of the laminar body 66 with a volume 70 of fluid deposited thereon. In the case of a single heating element, the concentric circles of FIGS. 10a and 10b represent conductive material of a single heating element that is configured in a pattern of concentric circles such as shown in FIG. 1. In the case of more than one heating element, the concentric circles of FIGS. 10a and 10b represent a singular heating element arranged concentrically with at least one other heating element wherein each heating element is individually controllable. For example, each concentric circle represents separate heating elements 72, 74, 76, 78. Alternatively, concentric circles 72 and 74 represent one heating element and circles 76 and 78 represent a second heating element. Concentric circles are used by way of example and not intended to be limiting. Also, although the laminar body of FIG. 10 is shown to be planar, the invention is not so limited and the embodiments described herein are applicable to any geometry.

When a volume 70 of fluid is placed on the one or more of the heating elements 72, 74, 76, 78 as shown in FIG. 10b, the resistance of the one or more heating elements changes such that current increases across the resistive layer to heat the fluid volume. The current/temperature response is similar to that shown in FIG. 8 for each of the one or more heating elements. In the case of more than one heating element and by way of example, heating element 78 will exhibit a return to a baseline current when fluid volume has evaporated such that it is not in thermal communication with heating element 78 at which point it may be turned off. As evaporation continues, and volume of fluid decreases and heating element 76 will exhibit a current response indicative of evaporation. It too may be controlled to shut down. This concentric heating continues until the fluid volume reaches a known desired volume. A coating comprising fluorinated urethane can be applied to the heating element to increase the surface hydrophobicity.

Figure 11A:
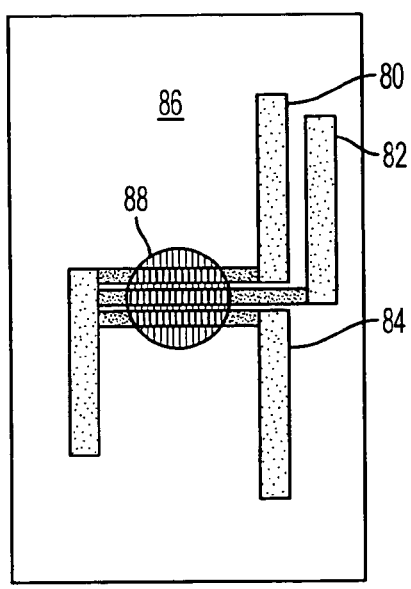
FIG. 11 is a top view of a drop of fluid on one embodiment of a laminar body having one or more heating elements according to the invention.
Figure 11B:
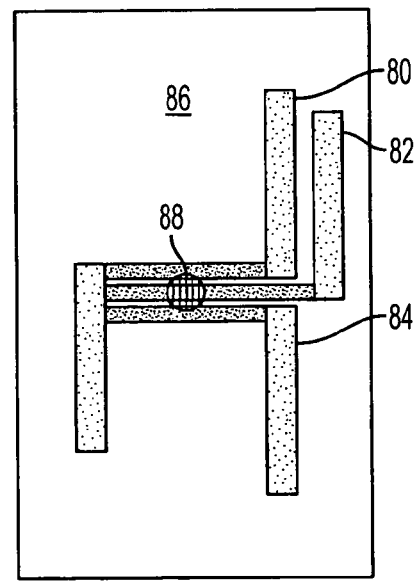

Yet another variation is shown in FIG. 11a. In this variation, one or more heating elements are configured on a substrate surface. For exemplary purposes, FIG. 11a shows three independently controlled heating elements 80, 82, 84 arranged in a linear pattern on a substrate surface 86; however, the invention is not so limited and any number of heating elements and patterns are within the scope of the invention. With a volume 88 of fluid placed on the heaters 80, 82, 84, the power differential required to keep each of the resistive heaters at a specific temperature is measured via the electronics component. The amount of power required to raise the element to a specific temperature is dependent on a number of factors including in part the ambient temperature, pressure, the heat transfer coefficient of the device, the thermal conductivity of the medium surrounding the device, the movement if any of the medium and the surface area of the device. As with a single heating element described above, an electrical signal such as the current, resistance, temperature and amount of power required to raise the element to a specific temperature will be a function of the amount of fluid that is in thermal contact with the resistance material of each heating element. Summarily, the entire fluid volume is measured. Thus, as the fluid volume 88 evaporates and reduces in size such that it does not contact the side heating elements 80 and 84 as shown in FIG. 11b, a differential change in the power required to keep the elements at a specific temperature, for example, can be detected. As the fluid volume 88 decreases the heat load on side heaters 80 and 84 will decrease faster than the middle heater 82 and when the fluid volume 88 does not contact the side heaters 80, 84, the heat load will be much less and detectable by measuring the differential power to keep the middle heater 82 at a specific temperature relative to the side heaters 80, 84. Hence, the fluid volume 88 is measured and can be concentrated to a desired volume.

A heater according to the invention is incorporated into a microfluidic circuit for heating a chamber, reservoir, channel or conduit. The heater allows for highly efficient elution of the analyte from the chamber so that a large amount of analyte may be released into a small volume of elution fluid. The heater may also be used to facilitate capture of the analyte. One advantage of the use of a heater in a small volume microchamber is that minimal energy is required to heat the chip.

Another advantage of the microfabricated chip is that it allows for rapid and direct heating of the internal attachment surfaces of the chamber. The integral nature and high thermal conductivity of the chamber walls and column structures allow for rapid heat transfer from the heating element directly to the attachment surfaces without necessitating heating of the fluid in the chamber. This improvement in efficiency is significant in terms of the speed, precision, and accuracy of the heating, as well as in the reduction in power required for the heating. In particular, the rapid and direct heating of the internal surfaces to which the analyte is bound greatly increases the degree and efficiency of the elution, and provides a significant improvement over prior art methods and devices. Tests have shown that recovery of nucleic acid with concentration to approximately 10 μL was approximately greater than 80%. Also, recovery of nucleic acid with concentration to dryness and then reconstituted with 10 μL of distilled water was approximately greater than 80% with the reservoir surface pre-treated with fluorinated urethane to increase surface hydrophobicity.

In one embodiment, the laminar heating element of the present invention is used to move microfluidic fluid volumes in a microfluidic circuit comprising channels, conduits, chambers and the like. In this embodiment, one or more laminar heating elements are positioned in thermal communication with a reservoir, channel, conduit, chamber or other geometry containing an air reservoir that are formed in the laminar body or in a second body. For example, a first conduit is interconnected to a second conduit wherein one or more heating elements are located proximate to the first conduit. The second conduit is filled with fluid and the first remains filled with air. When the heating elements are activated, the heating elements expand the volume of air by heating the area and raising the temperature of the air or other fluid. The expanding air or gaseous fluid exerts pressure on the fluid volume in the second conduit to move the fluid volume through channels and chambers of the fluidic circuit. Although the term conduit is used for exemplary purposes, the invention is not so limited and any geometry can be employed and substituted for the first and second conduits.

While the present invention has been described with reference to one or more particular variations, those skilled in the art will recognize that many changes may be made thereto without departing from the spirit and scope of the present invention. Each of these embodiments and obvious various thereof are contemplated as falling within the spirit and scope of the claimed invention, which is set forth in the claims.

The invention claimed is:

1. A device comprising:
   a laminar body comprising:
      a substrate having a first surface and a second surface;
      at least one heating element disposed on the first surface; the heating element comprising:
         a first contact and second contact through which electric current enters and leaves the heating element;
         a first conductive trace having a first end connected to the first contact;
         a second conductive trace having a second end connected to the second contact;
         the first conductive trace being patterned in a spaced relation separate from the second conductive trace;
         a resistive layer comprising a resistive material having a resistance temperature coefficient such that resistance changes with temperature; the resistive layer being disposed to permit current to flow from one conductive trace through the resistive material to the other conductive trace according to the temperature-based resistance of the resistive material; and
      at least one fluid-receiving location corresponding to the location of the at least one heating element wherein the heating element is in thermal communication with the fluid-receiving location.

2. The device of claim 1 wherein the resistance temperature coefficient is positive such that the resistance increases with increasing temperature.

3. The device of claim 1 wherein the conductive traces and resistive layer are disposed by printing electrically-conductive and resistive inks.

4. The device of claim 1 wherein the at least one heating element is arranged in a concentric pattern.

5. The device of claim 1 wherein the laminar body further includes at least one heating element disposed on the second surface of the substrate; the heating element comprising:
   a first contact and second contact through which electric current enters and leaves the heating element;
   a first conductive trace having a first end connected to the first contact;
   a second conductive trace having a second end connected to the second contact;
   the first conductive trace being patterned in a spaced relation separate from the second conductive trace;
   a resistive layer comprising a resistive material having a resistance temperature coefficient such that resistance changes with temperature; the resistive layer being disposed to permit current to flow from one conductive trace through the resistive material to the other conductive trace according to the temperature-based resistance of the resistive material.

6. The device of claim 1 further comprising
   a bridge circuit; the bridge including the heating element and a plurality of other resistors; and
   a control circuit for controlling a current in the bridge in such a manner that a predetermined temperature is maintained at the fluid-receiving location.

7. The device of claim 1 further including at least one geometry integrally formed in the laminar body at a location of the fluid-receiving location.

8. The device of claim 7 wherein at least one heating element is positioned along at least a portion of a surface of the geometry.

9. The device of claim 7 wherein at least one heating element is positioned at or above one or more predetermined volume graduation of the geometry.

10. The device of claim 7 wherein the geometry includes a reservoir or channel and the heating element is located adjacent to the reservoir or channel.

11. The device of claim 1 wherein further including a second body in thermal communication with the laminar body; the second body having at least one geometry configured to receive fluid and formed in the second body at a location corresponding to the fluid-receiving location of the laminar body.

12. The device of claim 11 wherein at least one heating element is positioned along at least a portion of a surface of the geometry.

13. The device of claim 11 wherein at least one heating element is positioned at or above one or more predetermined volume graduation of the geometry.

14. The device of claim 11 wherein the second body is a contact layer.

15. The device of claim 11 wherein the second body is a microfluidic device, a micro-centrifuge tube, or a micro-well plate.

16. The device of claim 11 wherein the laminar body and the second body are formed by a process to integrally marry the laminar body with the second body.

17. The device of claim 1 wherein the first contact and the first conductive trace are the same trace and the second contact and the second conductive trace are the same trace.

18. The device of claim 1 wherein the resistive layer is disposed over the first and second conductive traces electrically connecting the first and second conductive traces.

* * * * *